UNITED STATES PATENT OFFICE.

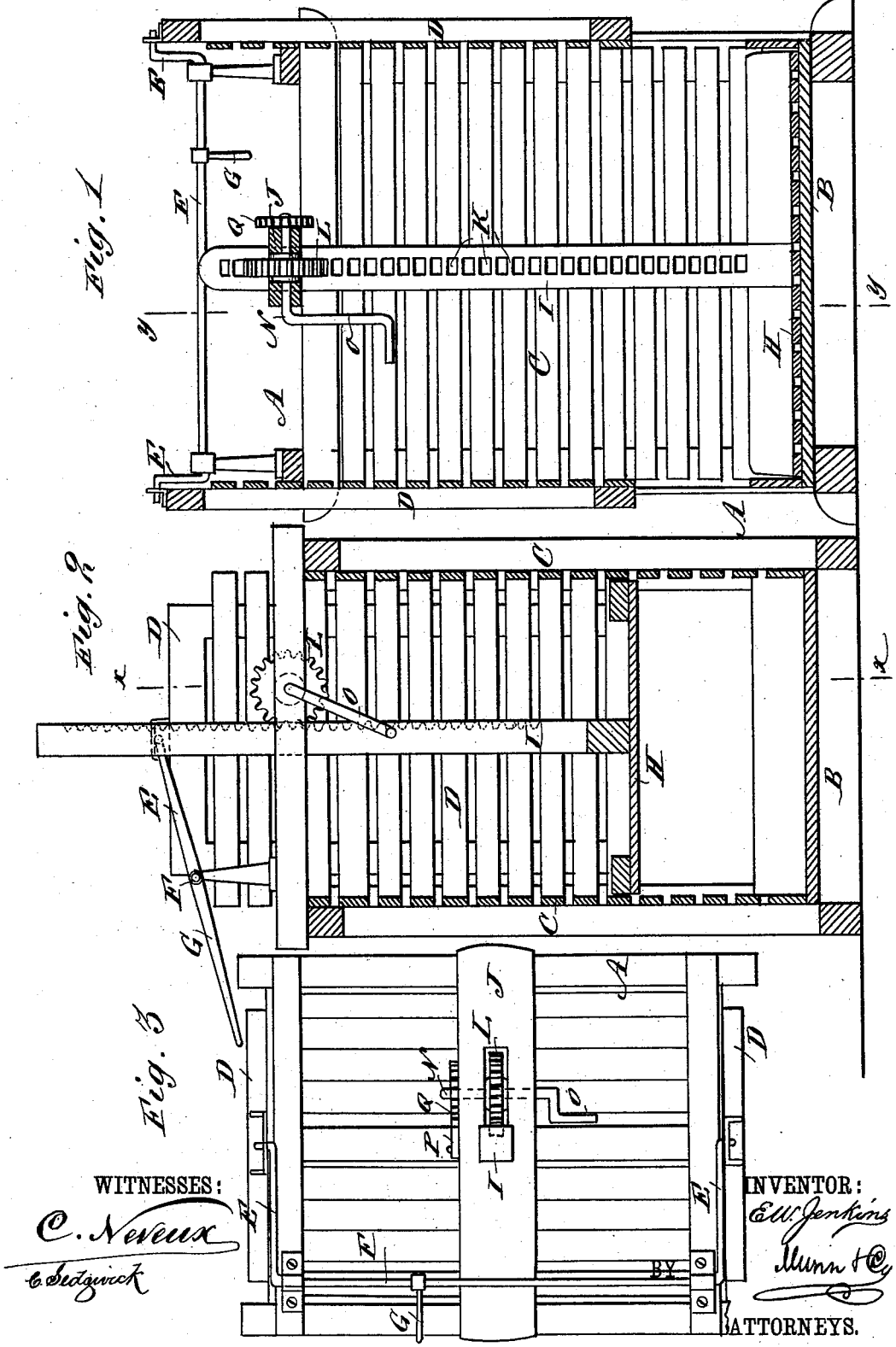

ELIJAH W. JENKINS, OF MILFORD, MISSOURI.

FISH TRAP AND FEEDING PEN.

SPECIFICATION forming part of Letters Patent No. 370,702, dated September 27, 1887.

Application filed November 15, 1886. Serial No. 218,915. (No model.)

*To all whom it may concern:*

Be it known that I, ELIJAH W. JENKINS, of Milford, in the county of Barton and State of Missouri, have invented a new and Improved Fish Trap and Feeding Pen, of which the following is a full, clear, and exact description.

The object of my invention is to provide a new and improved apparatus for feeding and trapping fish.

The invention consists in the construction and arrangement of parts and details, and combinations of the same, as will be fully described hereinafter, and then pointed out in the claim.

Reference is to be had to the accompanying drawings, forming a part of this specification, in which similar letters of reference indicate corresponding parts in all the figures.

Figure 1 is a sectional side elevation of my improvement on the line $xx$ of Fig. 2, showing the end gates open and the false bottom down. Fig. 2 is a sectional front elevation of the same on the line $yy$ of Fig. 1, showing the end gates and the false bottom raised; and Fig. 3 is a plan view of the same.

The frame or casing A, of suitable size and shape, is provided with a bottom, B, and with slatted sides C. In the open ends of the casing A are arranged to slide vertically the gates D, connected at their upper ends with the crank-arms E of the shaft F, mounted in suitable bearings on the top of the casing A and provided with a handle or lever, G, for turning the said shaft F, so as to open and close the end gates, D, simultaneously.

In the casing A is held the slatted false bottom H, attached in its center to an upright rod or bar, I, guided in a cross-beam, J, on the top of the casing A, and provided on one side with rack-teeth K, which mesh into the pinion L, secured to the shaft N, mounted on the cross-beam J, and provided with a crank-arm, O, which, when turned, produces an upward or downward motion of the vertical bar I and its false bottom H.

The apparatus is placed in a lake or stream at a deep spot, with the upper part of the casing A projecting above the water and connected by a suitable bridge or gang-plank with the bank of the stream or lake. The end gates, D, are held in an open position and the false bottom H rests on the bottom B, as shown in Fig. 1, when the fish are to be fed, the food being thrown into the casing and lying on the slats of the false bottom and on the bottom B, the fish having free access to the food from either end of the casing as the gates D are opened.

When it is desired to catch some fish, the end gates are simultaneously closed by turning the shaft F by means of the handle G, whereby the fish in the casing A are trapped, and the false bottom H is then moved upward by turning the handle or crank O, so as to cause a rotation of the pinion L and an upward motion of the rack-arm I and its false bottom H.

The bottom H can be held at any desired height by a pawl, P, engaging the ratchet-wheel Q, attached on the shaft N. The false bottom H, in moving upward, lifts the entrapped fish, and, when the bottom is moved sufficiently out of the water, then the operator is enabled to catch the fish easily.

Having thus described my invention, what I claim as new, and desire to secure by Letters Patent, is—

In a combined fish trap and feeding pen, the combination of the casing A, provided with the slatted sides C and the solid bottom B, of the end gates, D, adapted to slide vertically in the open ends of the casing, means, as described, for raising and lowering the said end gates simultaneously, a false bottom fitting in the said casing, a vertical rack-bar supporting the said false bottom, a pinion operating on the said rack-bar, and means, as described, for turning the said pinion so as to raise or lower the said rack-bar and its false bottom, substantially as set forth.

ELIJAH W. JENKINS.

Witnesses:
E. ATTEBERY,
J. B. HACKNEY.